United States Patent [19]
Currie et al.

[11] 3,826,165
[45] July 30, 1974

[54] APPARATUS FOR PROCESSING FOAM SHEET MATERIAL

[75] Inventors: Grover C. Currie, Lenoir; Brendan L. Doll, Patterson, both of N.C.

[73] Assignee: Cellu Products Company, Patterson, N.C.

[22] Filed: Mar. 22, 1973

[21] Appl. No.: 343,678

[52] U.S. Cl............... 83/110, 83/342, 83/346, 83/678
[51] Int. Cl............... B26d 3/00, B26f 1/20
[58] Field of Search ............ 83/678, 342, 344, 346, 83/347, 110; 29/6.1; 425/324, 385, 291, 299

[56] References Cited
UNITED STATES PATENTS

| | | | |
|---|---|---|---|
| 1,103,033 | 7/1914 | Clark | 29/6.1 |
| 1,511,054 | 10/1924 | Duncan | 83/346 X |
| 2,704,049 | 3/1955 | Vogt | 83/346 X |
| 3,550,826 | 12/1970 | Salmela | 83/678 X |
| 3,570,337 | 3/1971 | Morgan | 83/678 X |
| 3,640,279 | 2/1972 | Brown | 83/678 X |
| 3,728,918 | 4/1973 | Helm | 83/346 X |

*Primary Examiner*—J. M. Meister
*Attorney, Agent, or Firm*—Parrott, Bell, Seltzer, Park & Gibson

[57] ABSTRACT

An apparatus for slitting and opening elongate foam sheet material or the like to form an open, net-like, cushioning material. The apparatus includes slitting means comprising a pair of cylindrical rolls forming a nip therebetween through which the advancing sheet material passes. One of the rolls has a plurality of axially extending rows of spaced cutting blades on the surface thereof, the rows extending along a small helix angle with respect to the axis of the roll. The blades of adjacent rows are staggered, and a pair of drawing rolls are positioned immediately downstream of the slitting means to open the incisions and thereby insure that the advancing sheet will not be retained by the cutting blades.

17 Claims, 9 Drawing Figures

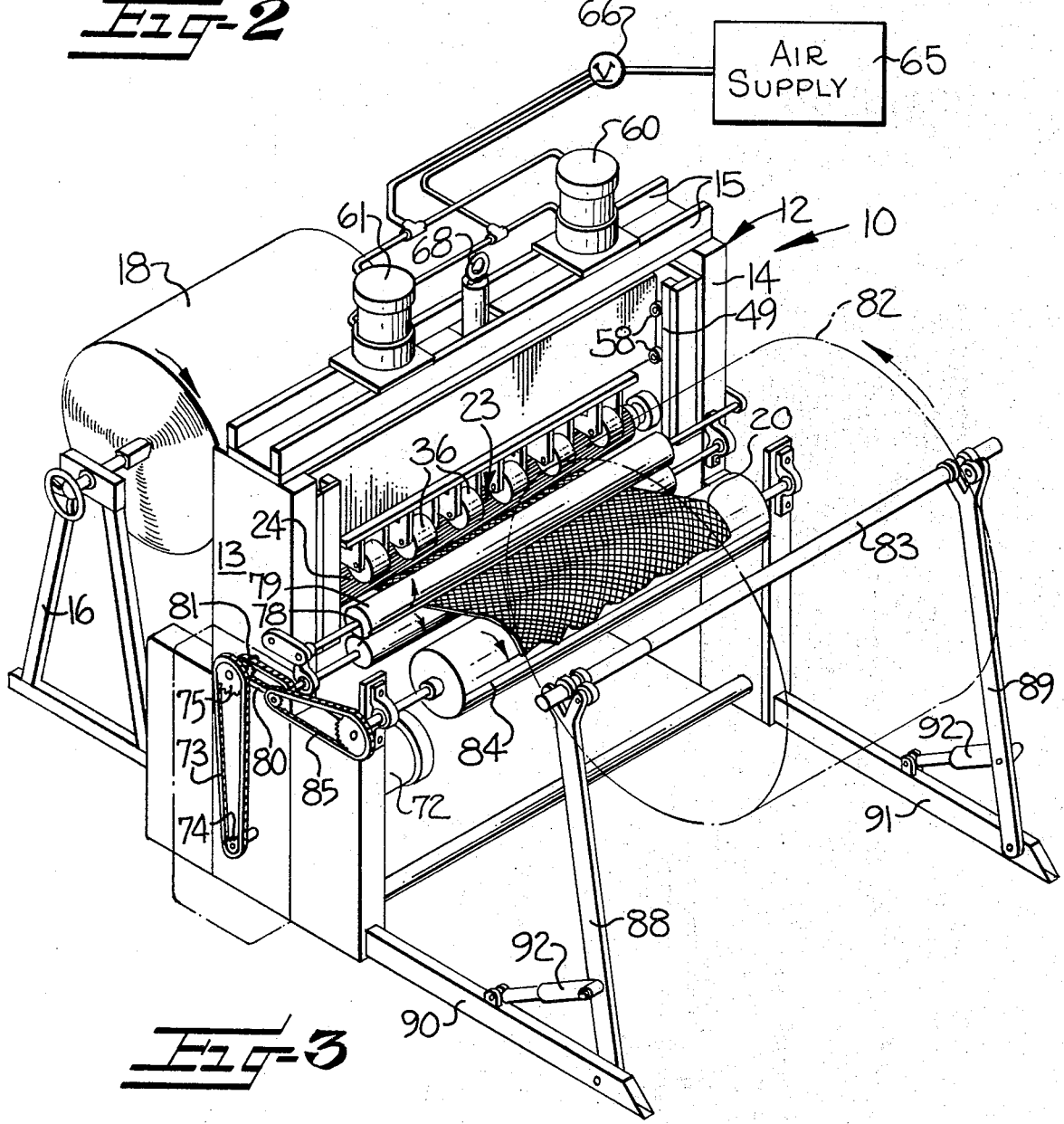

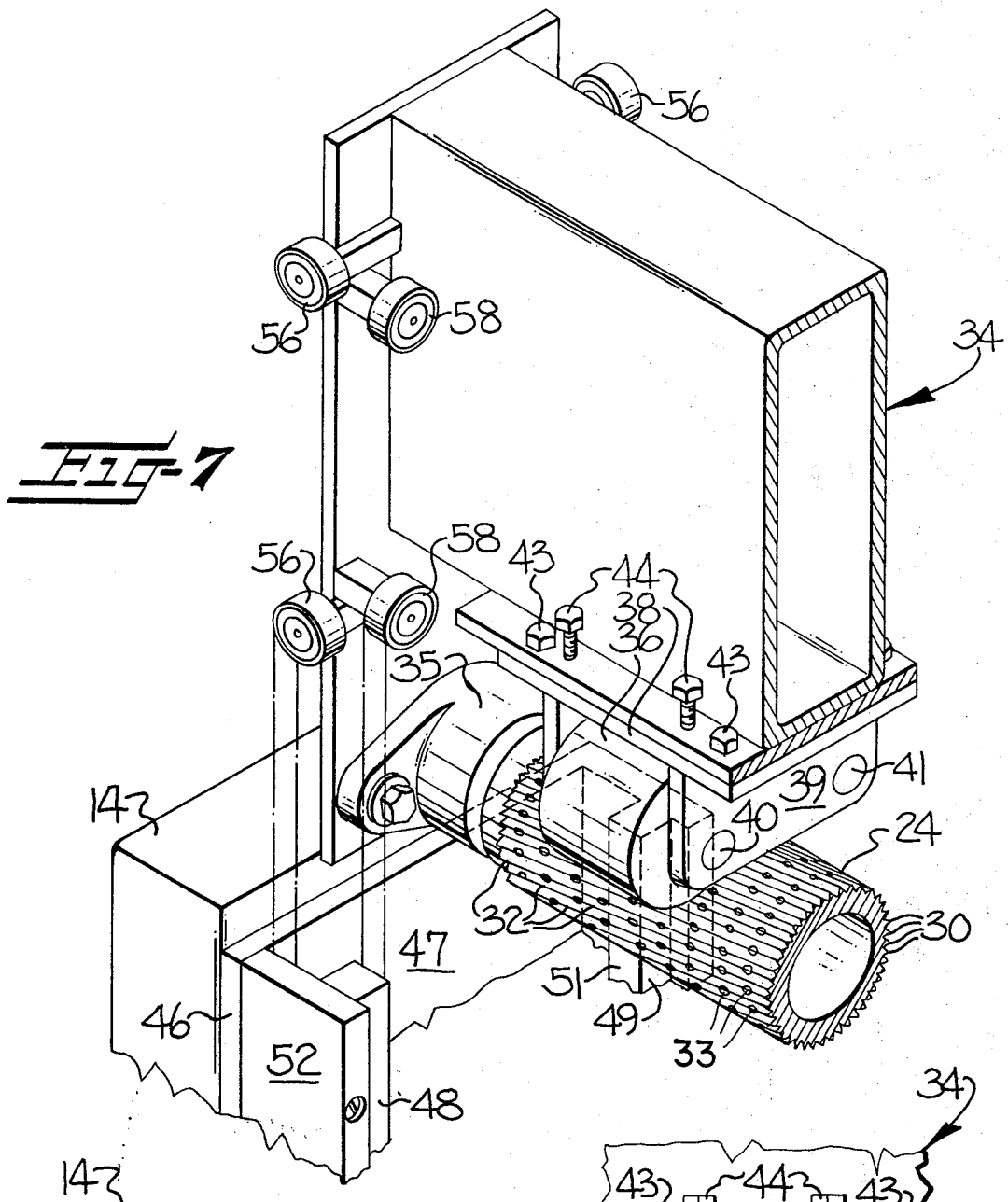

APPARATUS FOR PROCESSING FOAM SHEET MATERIAL

The present invention relates to an apparatus for processing elongate foam sheet material to form the same into an open cushioning material adapted for use in packaging and protecting articles susceptible to damage during handling and shipment thereof.

The prior patent to Martin Doll, U.S. Pat. No. 3,642,967, and of common assignee, discloses a method of producing a net-like thermoplastic foam material of significant structural rigidity and which is adapted for use in various packaging applications. The method includes slitting a sheet of thermoplastic foam material in a pattern of spaced incisions, opening the incisions into lozenge-like form by a force applied to the material transversely of the rows of incisions, and heat setting the material in the opened condition.

In order to slit the foam material in accordance with the process of the above patent, it has been proposed to pass the sheet between a slitting roll and a mating anvil roll, the slitting roll having spaced knives or cutting blades thereon to form the incisions. It has been found, however, that when it is desired to form the incisions in rows extending laterally across the advancing web, the axially extending rows of cutting blades on the slitting roll generate considerable chatter and vibration upon rotation in contact with the anvil roll. This not only results in the rapid deterioration of the apparatus, but it also significantly increases its power consumption.

It has also been found that the use of a slitting roll having axially extending rows of cutting blades also creates a problem in that the cutting blades tend to lock in the incisions of the foam material, and thus the foam material tends to be drawn around the slitting roll and is often torn or otherwise destroyed.

It is accordingly an object of the present invention to provide an apparatus for slitting a longitudinally advancing sheet of elongate foam material in rows of laterally extending spaced incisions and which avoids the disadvantages heretofore encountered.

It is another object of the present invention to provide an apparatus for efficiently slitting a longitudinally advancing sheet of elongate foam material at high production speeds and in a pattern of spaced apart rows of spaced incisions and with the rows extending laterally across the sheet.

It is a further object of the present invention to provide an apparatus for slitting an elongate foam material which includes a slitting roll which may be biased downwardly against the cooperating anvil roll to thereby insure a firm interengagement therebetween and thereby provide an uninterrupted cutting action.

It is still another object of the present invention to provide an apparatus of the described type and which incorporates means for reinforcing the slitting roll and anvil roll so that they may be constructed of relatively small diameter to thereby decrease the overall size and cost of the apparatus.

These and other objects and advantages of the present invention are achieved in the embodiment illustrated herein by the provision of an apparatus which includes a pair of cylindrical rolls comprising a slitting roll and mating anvil roll carried by a frame and forming a nip therebetween through which the foam material passes. The slitting roll has a plurality of axially extending rows of spaced cutting blades projecting radially therefrom and the blades in adjacent rows are staggered to form the incisions through the foam material. The rows of cutting blades are disposed along a small helix angle with respect to the axis of the roll such that the rows of spaced incisions extend laterally across the sheet at an angle somewhat less than 90° to the direction of advance. The apparatus further comprises means for advancing the foam sheet material, and means positioned downstream of the slitting means for longitudinally expanding the sheet to open the incisions and thereby insure that the advancing sheet will not be retained by the cutting blades. The slitting roll may be mounted on a translatable carriage, and means are provided for vertically translating the carriage to bias the same downwardly into contact with the underlying anvil roll. Also, a plurality of spaced trunnion wheels are mounted along the sides of both the slitting roll and anvil roll to reinforce the same and thereby prevent undesired flexing.

Some of the objects of the invention having been stated, other objects will appear as the description proceeds, when taken in connection with the accompanying drawings, in which FIG. 1 is a plan view of a portion of a slitted sheet of foam material processed in accordance with the present invention;

FIG. 2 is a perspective view of a portion of a slitted and opened sheet of foam material processed in accordance with the present invention;

FIG. 3 is a perspective view of an apparatus incorporating the features of the present invention;

FIG. 7 is a fragmentary perspective view of the carriage and associated slitting roll, and illustrating the manner in which the same may be vertically received in the frame of the apparatus;

FIG. 8 is a fragmentary sectional plan view taken substantially along the line 8—8 of FIG. 6 and illustrating the carriage receiving channel in the frame;

FIG. 9 is a fragmentary sectional view taken substantially along the line 9—9 of FIG. 6 and illustrating the mounting structure for the trunnion wheels.

Figure 4:
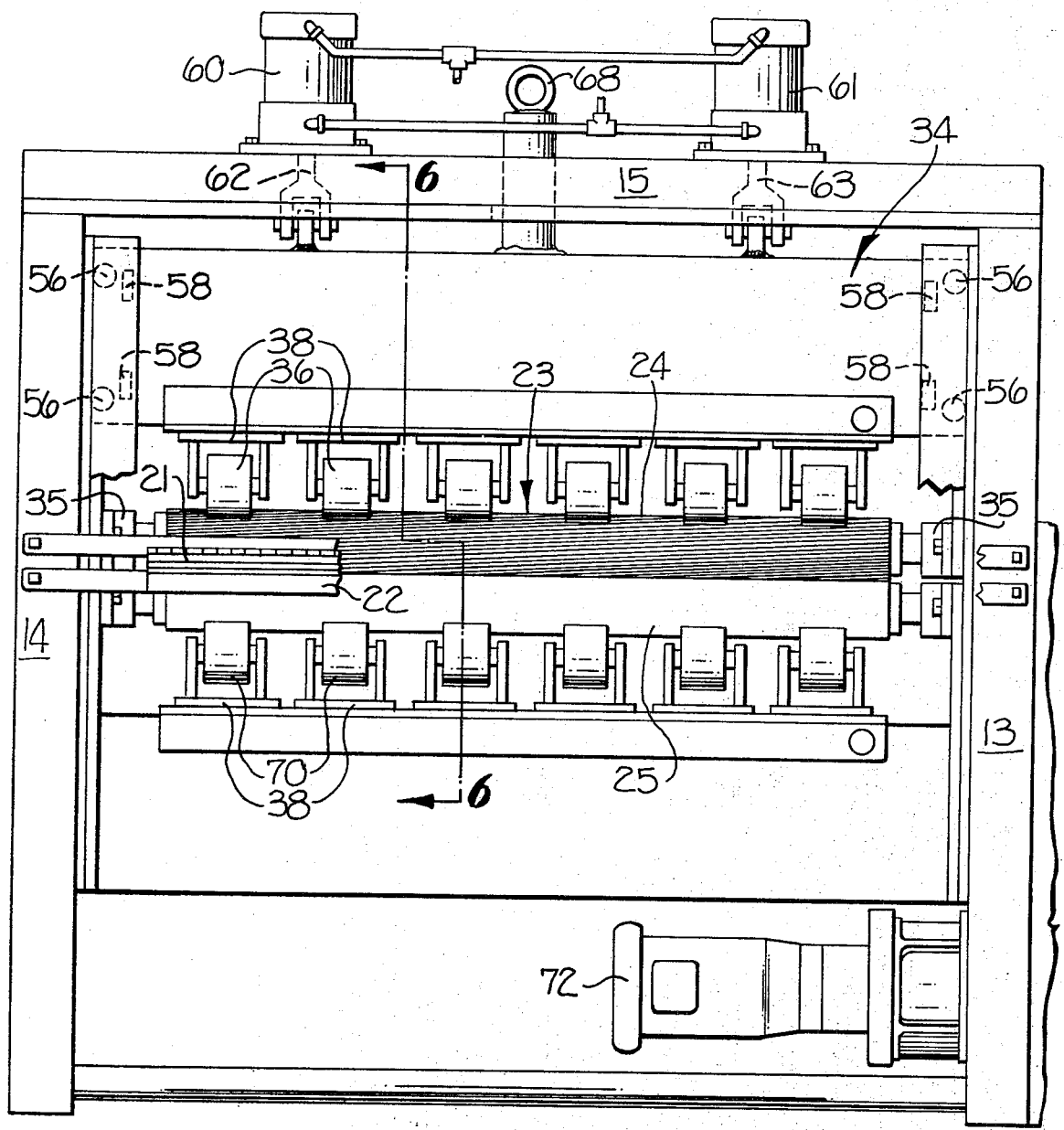
FIG. 4 is a front elevational view, partly broken away, of the apparatus shown in FIG. 3.

Referring more specifically to the drawings, an apparatus embodying the features of the present invention is indicated generally at 10, and includes a central frame 12 comprising a pair of spaced uprights 13 and 14 forming the sides of the apparatus, and an overhead beam 15 extending between and resting upon the uprights. A delivery stand 16 is mounted at the front of the apparatus for rotatably supporting a roll of elongate foam thermoplastic sheet material 20 or the like. The sheet material 20 is withdrawn from the roll 18 and advanced between the guide plates 21 and 22, and then to the slitting means generally indicated at 23.

The slitting means 23 comprises the slitting roll 24 and mating anvil roll 25, and serves to slit the advancing sheet in a pattern of spaced apart rows 26 of spaced incisions 28 and with the rows 26 extending laterally across the sheet at an angle A with respect to the direction of advance (note FIG. 1). As hereinafter further explained, the angle A is somewhat less than 90°. Also, the incisions in each row are of equal length and equally spaced, and the incisions in adjacent rows are in staggered relationship.

To form the rows of incisions along the direction indicated in FIG. 1, the slitting roll 24 includes a plurality of axially extending rows 30 of spaced cutting blades 32 projecting radially therefrom. The spaced cutting blades are defined by a plurality of equally spaced, radial apertures 33. Also, the blades have an inverted V-shaped profile defining an included angle of about 60°, and are of equal length and equally spaced and with the blades in adjacent rows being staggered. As best seen in FIG. 9, the rows 30 of cutting blades are disposed along a relatively small helix angle B with respect to the axis of the roll. The particular helix angle B employed can vary somewhat, but the angle should be sufficient to permit at least three of the rows of cutting blades to simultaneously contact the anvil roll 25 since this has been found desirable in preventing chatter. Also, the angle should not be so great as to cause a readily visible inclination in the rows 26 of incisions 28 in the finished foam material. In addition, too large a helix angle may cause difficulty during the subsequent drawing or opening operation on the foam material and as further described herein since the inclined rows of incisions may cause the material to skew in the drawing rolls. In this regard, it has been found that in most applications the helix angle B should be between about 2° and 10°. Thus the angle A for the rows 26 of incisions 28 in the foam material 20 will in such cases extend between about 80° and 88°. A helix angle of this order has been found to be sufficient to avoid the chatter or vibration associated with cutting blades which parallel the axis of the roll, and the angle of the rows 26 is not readily apparent in the finished product and does not adversely effect subsequent processing.

Further details of the structural nature and construction of the slitting roll 24 may be obtained from copending application Ser. No. 343,677 by the present applicants entitled "Slitting Roll and Method of Fabricating Same" and filed concurrently herewith.

The slitting and anvil rolls are carried by the frame 12 of the apparatus along parallel horizontal axes. More particularly the slitting roll 24 is rotatably mounted on a carriage 34 which in turn is translatably mounted between the uprights 13 and 14 of the apparatus for movement in a vertical direction, note FIG. 7. The slitting roll is mounted on the carriage 34 by a pair of suitable bearings 35, and a plurality of spaced pairs of trunnion wheels 36 are rotatably carried by the carriage immediately above and along the length of the slitting roll so as to bear against the surface of the roll on the side thereof opposite the nip. By this arrangement, the trunnion wheels 36 act to reinforce and prevent the flexing of the slitting roll 24 during the passing of the foam material through the nip and thereby insure complete cutting by the cutting blades. Thus the use of the trunnion wheels permits the slitting roll to be reduced in diameter so that its cost is lowered as compared to that of a large roll which would alone possess a comparable degree of rigidity.

As best seen in FIGS. 7 and 9, the trunnion wheels 36 are mounted in pairs from a bracket 38 which is adjustably mounted on the carriage 34. In particular, each bracket 38 includes a spaced pair of downwardly directed arms 39 mounting the shafts 40, 41 which extend parallel to the axis of the roll 24. The trunnion wheels 36 are each rotatably positioned on one of the shafts 40, 41 such that when the bracket 38 is moved downwardly, the associated pair of trunnion wheels are brought into contact with the surface of the roll 24. The vertical adjustment of the bracket is accomplished by the bolts 43, 44 in the manner apparent from FIG. 9. Typically, the trunnion wheels 36 are fabricated from a hard plastic material such as high density polyethylene so that they may be brought into contact and rotated by the roll 24 without damage thereto.

The carriage 34 is mounted for vertical translation along each of the uprights 13 and 14 by the structure shown in FIGS. 7 and 8. More particularly, each of the uprights mounts a vertical plate 46 defining a laterally facing bearing surface 47, and a pair of vertical posts 48, 49 defining opposing and longitudinally facing surfaces 50 and 51 respectively. The posts are mounted in spaced relation in front of the surface 47 by the side arms 52 and 53. Each end of the carriage 34 mounts a first set of rotatable casters 56 adapted to engage the surface 47 to limit the lateral movement of the carriage, and a second set of rotatable casters 58 to limit the longitudinal movement of the carriage. As will become apparent, the entire carriage may thus be lifted from the frame to permit servicing of the roll 24 when the overlying beam 15 is removed. It will also be apparent that the weight of the carriage and roll 24 (typically about 300 pounds) is transmitted across the nip to the anvil roll 25. This weight serves to prevent the slitting roll 24 from lifting upwardly during operation of the apparatus which could result in an incomplete cutting of the incisions 28 in the foam material.

To further guard against the possibility of the carriage lifting during operation of the apparatus, there is provided an air control system for vertically translating the carriage in either direction whereby the carriage and slitting roll may be biased downwardly to further increase the pressure across the nip during operation, or lifted to separate the slitting roll from the anvil roll and thereby facilitate initial threading of the foam material therethrough. The air control system includes a pair of air cylinders 60, 61 fixedly carried on the transverse beam 15. A piston (not shown) is operatively disposed in each cylinder and is connected to the carriage by the connecting rods 62, 63 as seen in FIG. 4. An air supply is schematically indicated at 65 and a suitable valve 66 is provided to control the air entering the cylinders so that the pistons may be selectively raised or lowered in unison. The pressure in the air system is typically about 100 psi, and the diameter of the two pistons may be about 6 inches, thus providing a significant downward pressure which insures a proper cutting action at high production speeds of 200 feet per minute or even higher.

As noted above, the carriage 34 may be entirely lifted from the frame to permit servicing or changing of the slitting roll. In this regard, the connecting rods 62, 63 of the air control system are released, and the beam 15 disconnected and lifted away to expose the handle 68 which is fixedly connected to the carriage. The handle 68 may then be connected to a suitable winch or the like to lift the carriage vertically upwardly from the frame and transport the same to a suitable servicing area. As will be apparent, the carriage is replaced by reversing the above procedure.

The anvil roll 25 is rotatably mounted to the frame 12 along a fixed horizontal axis as best seen in FIG. 4. A plurality of spaced pairs of trunnion wheels 70 underlie the roll 25 and are carried in a fixed position by the frame. These pairs of trunnion wheels are similar in structure to the trunnion wheels 36 as described above with respect to the slitting roll 24, and they serve to reinforce the anvil roll 25 to prevent the flexing thereof. Thus by employing the trunnion wheels 36 and 70 in association with both the slitting roll 24 and the anvil roll 25, the size of these rolls and thus the overall size and cost of the apparatus may be significantly reduced.

The surface of the anvil roll 25 is cylindrical and fabricated from a suitable hard material, such as hardened steel, and the roll is rotated by an electric motor 72 acting through the drive chain 73 and sprockets 74, 75. As will be apparent, the intimate contact between the slitting roll 24 and the anvil roll 25 causes the slitting roll 24 to rotate with the anvil roll to thereby advance the foam material through the nip. Thus the rolls pull the foam material through the apparatus while slitting the same.

Figure 5:
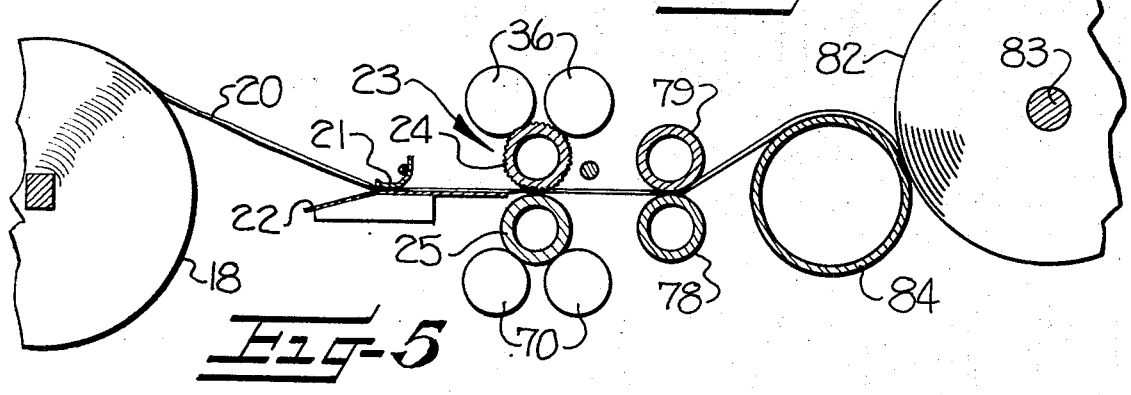
FIG. 5 is a fragmentary longitudinal section view showing the delivery means, slitting means, drawing rolls, and take-up means of the present invention.
Figure 6:
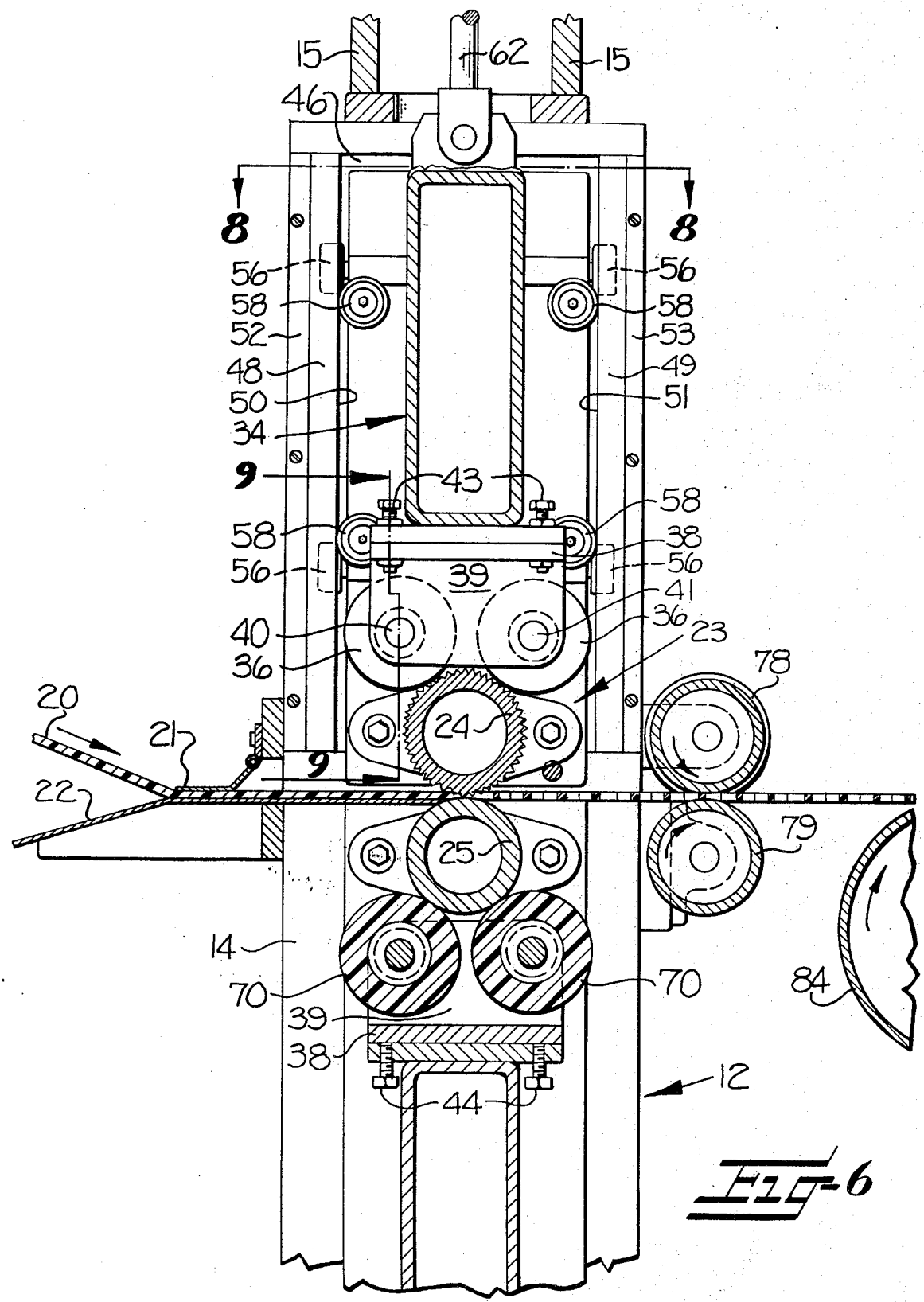
FIG. 6 is a longitudinal section view of the apparatus taken substantially along the line 6—6 of FIG. 4.

The apparatus of the present invention further includes drawing means positioned downstream of the slitting means for longitudinally expanding the sheet immediately upon leaving the nip between the rolls 24 and 25 to open the incisions 28 and thereby insure that the advancing sheet will not be retained by the cutting blades of the slitting roll adhering within the incisions. As best seen in FIGS. 5 and 6, the drawing means comprise a pair of mating rolls 78, 79 which are rotatably carried by the frame and which form a second nip therebetween which is horizontally aligned with the nip of the slitting means. The drawing rolls 78, 79 are operatively rotated such that their surface speed is substantially greater than that of the slitting and anvil rolls, such rotation being accomplished by means of suitable drive gears (not numbered) operatively connected via the drive chain 80 to a small diameter sprocket 81 positioned on a common shaft with the sprocket 75. Typically, the drawing rolls have a surface speed of about three times that of the rolls of the slitting means for most patterns of incisions.

After passing through the drawing means, the sheet material 20 is formed into a wound roll 82 by the take-up means as best seen in FIG. 3. As shown, the take-up means includes a spindle 83 about which the foam material is wound, and a drive drum 84 rotatably mounted on the frame for rotating the wound roll. The drum 84 is rotatably driven by the drive chain 85 operatively connected to the shaft of the drawing roll 78, and typically, the drum 84 is rotated at a surface speed about two and one-half times that of the rolls 24, 25 of the slitting means so that there is a slight degree of longitudinal contraction of the foam material between the drawing rolls 78, 79 and the drum 84.

The spindle 83 is rotatably and pivotally mounted on a framework such that the spindle and wound roll may be pivoted into frictional contact with the drive drum 84 to thereby rotate the wound roll. The framework includes the upwardly directed spaced arms 88, 89 which are pivotally mounted at their lower ends to the horizontal base members 90, 91 respectively. A dampened spring biasing member 92 is interposed between each of the horizontal members and upright arms to draw the arms toward the drum 84. As will be apparent, when the wound roll 82 reaches maximum capacity, the sheet of foam material may be cut and the spindle lifted to remove the same from the arms so that the roll 82 can be transported to a suitable location for storage or further processing.

As will be understood, the foam material processed in the manner described above is typically resilient, soft and readily stretchable. While the material is somewhat stretched or longitudinally expanded when positioned on the wound roll 82, the material will normally contract when the tension is released by reason of its inherent elasticity. If a more rigid material is desired, the foam material may be further processed in accordance with the method described in the above U.S. Pat. No. 3,642,967. Generally, such further processing involves opening the incisions into a lozenge-like form by the exertion of a longitudinal force, and heating the material to a temperature to overcome its elastic memory while maintaining the open condition. The sheet is then cooled to set the same in its open condition.

In the drawings and specification, there has been set forth a preferred embodiment of the invention, and although specific terms are employed, they are used in a generic and descriptive sense only and not for purposes of limitation.

That which is claimed is:

1. An apparatus for processing elongate foam sheet material or the like to form the same into an open cushioning material adapted for use in packaging and protecting articles susceptible to damage during handling and shipment thereof, said apparatus comprising
    a frame,
    a slitting roll and an anvil roll carried by said frame along parallel axes and forming a nip therebetween through which the foam material passes, said slitting roll having a plurality of axially extending rows of spaced cutting blades projecting radially therefrom, the blades in adjacent rows being in staggered relationship, and said rows being disposed along a helix such that at least three rows simultaneously contact said anvil roll,
    means for rotatably mounting said slitting roll on said frame and including a plurality of spaced trunnion wheels rotatably carried by said frame and bearing against the surface of said slitting roll on the side thereof opposite the nip whereby the trunnion wheels act to reinforce and prevent the flexing of said slitting roll during the passing of the foam material through the nip and thereby insure complete cutting by said cutting blades,
    means for rotatably mounting said anvil roll on said frame,
    means for operatively rotating the slitting and anvil rolls to advance the foam sheet material through said nip such that the cutting blades slit the foam sheet material passing therethrough in a pattern of spaced apart rows of spaced incisions and with the rows extending laterally across the sheet and with the incisions in adjacent rows being in staggered relationship, and
    drawing means positioned downstream of said slitting and anvil rolls for longitudinally expanding the sheet material immediately upon leaving said nip thereof to open the incisions and thereby insure that the advancing sheet material will not be retained by the cutting blades of said slitting roll.

2. The apparatus as defined in claim 1 wherein said anvil roll comprises a smooth cylindrical surface, and said trunnion wheels are each mounted for rotation about an axis extending parallel to the axis of said slitting roll and each comprises a smooth cylindrical outer surface.

3. The apparatus as defined in claim 2 wherein said spaced cutting blades are of equal length and equally spaced along said rows, and said rows of cutting blades are disposed along a helix extending between about 2° and 10° with respect to the axis of said slitting roll and such that the rows of incisions extend laterally across the sheet at an angle between about 80° and 88° to the direction of advance.

4. The apparatus as defined in claim 3 wherein said means for rotatably mounting said anvil roll includes a plurality of second spaced trunnion wheels rotatably carried by said frame and bearing against the surface of said anvil roll on the side thereof opposite the nip whereby the second trunnion wheels act to reinforce and prevent flexing of said anvil roll during the passing of the foam material through the nip.

5. The apparatus as defined in claim 1 wherein said means for rotatably mounting said slitting roll on said frame includes a carriage translatably mounted on said frame, said slitting roll and associated trunnion wheels being rotatably mounted on said carriage, and means for translating said carraige toward and away from said anvil roll to permit said slitting roll to be selectively biased against said anvil roll and thereby insure a firm interengagement therebetween.

6. An apparatus for processing elongate foam sheet material or the like to form the same into an open cushioning material adapted for use in packaging and protecting articles susceptible to damage during handling and shipment thereof, said apparatus comprising
   a frame,
   first and second cylindrical rolls, one of said first and second rolls having a plurality of axially extending rows of spaced cutting blades projecting radially therefrom, the blades in adjacent rows being in staggered relationship, and said rows being disposed along a helix extending between about 2° and 10° with respect to the axis of said one roll and such that at least three rows simultaneously contact the other of said rolls
   means for rotatably mounting said second roll on said frame to define a horizontal axis,
   means for rotatably and translatably mounting said first roll on said frame and along an axis parallel to and immediately above said horizontal axis to form a nip between said first and second rolls through which the foam material passes, said first roll mounting means including a carriage rotatably mounting said first roll, and means for translatably mounting said carriage on said frame for movement in a vertical direction to permit said first roll to be moved toward and away from said second roll and with the weight of said carriage and first roll being transmitted across said nip to said second roll, and
   means for operatively rotating said first and second rolls to advance the foam sheet material through said nip such that the cutting blades slit the foam sheet material passing therethrough in a pattern of spaced apart rows of spaced incisions and with the rows extending laterally across the sheet and with the incisions in adjacent rows being in staggered relationship.

7. The apparatus as defined in claim 6 wherein said means for translatably mounting said carriage on said frame includes means for vertically translating said carriage and said first roll in either direction whereby the same may be biased downwardly to increase the pressure across said nip or lifted to separate said first and second rolls.

8. The apparatus as defined in claim 7 wherein said means for vertically translating said carriage and first roll includes an air cylinder fixedly carried on said frame, a piston operatively disposed in said cylinder and connected to said carriage, and air supply means for selectively raising and lowering said piston within said cylinder.

9. The apparatus as defined in claim 7 wherein said rows of spaced cutting blades are positioned on said first roll, and said second roll comprises a smooth cylindrical surface.

10. An apparatus for processing elongate foam sheet material or the like to form the same into an open cushioning material adapted for use in packaging and protecting articles susceptible to damage during handling and shipment thereof, said apparatus comprising
    means for slitting an advancing sheet of elongate foam sheet material in a pattern of spaced apart rows of spaced incisions and comprising a pair of cylindrical rolls forming a nip therebetween through which the foam material is adapted to pass, one of said rolls having a plurality of rows of spaced cutting blades projecting radially therefrom and with said rows of cutting blades being disposed along a helix extending between about 2° and 10° with respect to the axis of said one roll and with the blades in adjacent rows being staggered,
    means for advancing the foam sheet material through said nip of said pair of cylindrical rolls, and
    drawings means positioned downstream of said slitting means for longitudinally expanding the sheet immediately upon leaving the nip of said pair of rolls to open the incisions and thereby ensure that the advancing sheet will not be retained by the cutting blades of said one roll.

11. The apparatus as defined in claim 10 wherein at least three of said rows of spaced cutting blades on said one roll simultaneously contact the other of said rolls.

12. The apparatus as defined in claim 11 wherein said cutting blades are of substantially equal length and substantially equally spaced along the rows.

13. The apparatus as defined in claim 12 wherein said means for advancing the foam sheet material comprises means for rotatably driving said pair of rolls whereby said rolls pull the foam material through said apparatus while slitting the same.

14. The apparatus as defined in claim 10 further comprising take-up means positioned downstream of said drawing means for forming the advancing foam material into a wound roll.

15. The apparatus as defined in claim 10 wherein said drawing means comprises a pair of drawing rolls forming a nip therebetween through which the foam material passes, and means for operatively rotating said pair of drawing rolls at a surface speed substantially greater than that of said pair of cylindrical rolls.

16. An apparatus for processing elongate foam sheet material or the like to form the same into an open cushioning material adapted for use in packaging and protecting articles susceptible to damage during handling and shipment thereof, said apparatus comprising a frame, a slitting roll and an anvil roll carried by said frame along parallel axes and forming a nip therebetween through which the foam material passes, said slitting roll having a plurality of axially extending rows of spaced cutting blades projecting radially therefrom, the blades in adjacent rows being in staggered relationship, means for rotatably mounting said slitting roll on said frame and including a plurality of spaced trunnion wheels rotatably carried by said frame and bearing against the surface of said slitting roll on the side thereof opposite the nip whereby the trunnion wheels act to reinforce and prevent the flexing of said slitting roll during the passing of the foam material through the nip and thereby insure complete cutting by said cutting blades, means for rotatably mounting said anvil roll on said frame, means for operatively rotating the slitting and anvil rolls to advance the foam sheet material through said nip such that the cutting blades slit the foam sheet material passing therethrough in a pattern of spaced apart rows of spaced incisions and with the rows extending laterally across the sheet and with the incisions in adjacent rows being in staggered relationship, drawing means positioned downstream of said slitting and anvil rolls for longitudinally expanding the sheet immediately upon leaving the nip thereof to open the incisions and thereby insure that the advancing sheet will not be retained by the cutting blades of said slitting roll, said drawing means comprising a pair of drawing rolls rotatably carried by said frame and forming a nip therebetween through which the foam material passes, and means for operatively rotating said pair of drawing rolls at a surface speed substantially greater than that of said slitting and anvil rolls, and take-up means positioned downstream of said drawing means for forming the advancing foam material into a wound roll, said take-up means including a spindle about which the foam material is adapted to be wound, a drive drum rotatably mounted on said frame, means for rotating said drive drum, and means for rotatably and pivotally mounting said spindle on said frame such that the spindle and wound roll may be pivoted into frictional contact with said drive drum to rotate the spindle and wound roll and wherein the spindle pivots away from said drive drum as the size of the wound roll increases.

17. The apparatus as defined in claim 16 wherein said means for rotatably and pivotally mounting said spindle includes means for resiliently biasing the spindle toward said drive drum.

* * * * *